US010192575B1

United States Patent
Resh

(10) Patent No.: US 10,192,575 B1
(45) Date of Patent: Jan. 29, 2019

(54) SPLIT ACTUATOR WITH MULTIPLE HEAD STACK ASSEMBLIES BONDED TO BEARING SLEEVES

(71) Applicant: Seagate Technology LLC, Cupertino, CA (US)

(72) Inventor: Roger A. Resh, Prior Lake, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/798,535

(22) Filed: Oct. 31, 2017

(51) Int. Cl.
G11B 21/02 (2006.01)
G11B 5/48 (2006.01)

(52) U.S. Cl.
CPC ............ *G11B 5/4813* (2013.01); *G11B 21/02* (2013.01)

(58) Field of Classification Search
None
See application file for complete search history.

(56) References Cited

U.S. PATENT DOCUMENTS

| | | | |
|---|---|---|---|
| 4,544,972 A | 10/1985 | Kogure et al. | |
| 4,896,239 A * | 1/1990 | Ghose | F16C 25/08 360/267 |
| 5,048,980 A * | 9/1991 | Dickinson | F16C 27/066 384/536 |
| 5,491,598 A * | 2/1996 | Stricklin | F16C 19/52 310/51 |
| 5,666,242 A * | 9/1997 | Edwards | F16C 27/066 360/265.6 |
| 5,727,882 A * | 3/1998 | Butler | F16C 27/066 384/536 |
| 5,761,007 A | 6/1998 | Price et al. | |
| 5,805,386 A * | 9/1998 | Faris | G11B 5/4813 360/264.4 |
| 6,005,743 A | 12/1999 | Price et al. | |
| 6,163,441 A * | 12/2000 | Wood | F16C 27/04 360/266.1 |
| 6,256,173 B1 * | 7/2001 | Chee | G11B 5/4813 360/265.6 |
| 6,377,420 B1 * | 4/2002 | Tadepalli | G11B 25/043 360/97.19 |
| 6,411,472 B1 * | 6/2002 | Allsup | F16C 27/04 360/265.7 |
| 6,457,096 B1 | 9/2002 | Ageishi et al. | |
| 6,480,363 B1 | 11/2002 | Prater | |
| 6,490,138 B1 | 12/2002 | Prater | |

(Continued)

FOREIGN PATENT DOCUMENTS

JP 2003139140 A * 5/2003

*Primary Examiner* — William J Klimowicz
(74) *Attorney, Agent, or Firm* — Hollingsworth Davis, LLC

(57) ABSTRACT

An apparatus includes at least one actuator shaft. First and second head stack assemblies are coaxially located on the actuator shaft(s). The first and second head stack assemblies each include: at least one bearing having an inner race coupled to an outer surface of the actuator shaft(s); an E-block surrounding an outer race of the at least one bearing; an annular gap is between the E-block and the outer race of the at least one bearing; a ring of bonding material filling the annular gap; and an access gap providing a fluid path to the annular gap from at least one of a top and a bottom of the E-block.

18 Claims, 4 Drawing Sheets

(56) References Cited

U.S. PATENT DOCUMENTS

| | | | |
|---|---|---|---|
| 6,501,615 B1 * | 12/2002 | Kelsic | G11B 33/08 360/265.6 |
| 6,519,109 B1 | 2/2003 | Price et al. | |
| 6,556,387 B1 * | 4/2003 | Misso | G11B 5/5521 360/265.6 |
| 6,560,075 B2 | 5/2003 | Price et al. | |
| 6,618,226 B2 * | 9/2003 | Prater | G11B 5/4813 360/265.7 |
| 6,657,822 B1 * | 12/2003 | Nakamura | G11B 5/60 360/265.6 |
| 6,809,898 B1 * | 10/2004 | Prochazka | F16C 19/54 310/90 |
| 6,847,504 B1 | 1/2005 | Bennett et al. | |
| 6,924,962 B2 * | 8/2005 | Jeong | G11B 33/08 360/265.4 |
| 7,085,108 B1 * | 8/2006 | Oveyssi | G11B 5/4813 360/265.2 |
| 9,361,919 B1 | 6/2016 | Lieu et al. | |
| 2002/0060885 A1 | 5/2002 | Money | |
| 2003/0156358 A1 * | 8/2003 | Jeong | G11B 33/08 360/265.6 |
| 2004/0066572 A1 * | 4/2004 | Hofland | G11B 25/043 360/97.11 |

* cited by examiner

SPLIT ACTUATOR WITH MULTIPLE HEAD STACK ASSEMBLIES BONDED TO BEARING SLEEVES

SUMMARY

The present disclosure is directed to a method, system, and apparatus configured with a split actuator having multiple head stack assemblies bonded to bearing sleeves. In one embodiment, an apparatus includes at least one actuator shaft. First and second head stack assemblies are coaxially located on the actuator shaft(s). The first and second head stack assemblies each include: at least one bearing having an inner race coupled to an outer surface of the actuator shaft(s); an E-block surrounding an outer race of the at least one bearing; an annular gap is between the E-block and the outer race of the at least one bearing; a ring of bonding material filling the annular gap; and an access gap providing a fluid path to the annular gap from at least one of a top and a bottom of the E-block.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure generally relates to magnetic hard disk drives. For many years, disk drives have utilized stacks of multiple disks for storing data, and further utilized both sides of the disks for storing data. In such an arrangement, one read/write head (also referred to as slider, head, recording/write head, read head, etc.) is positioned over each disk surface by an actuator-driven arm, and only one head is used for reading or writing at a time. The present disclosure relates to disk drives that can simultaneously read from or write to two or more heads. In this way, the input/output (I/O) bandwidth can be increased by a factor of two or more using existing recording technologies (e.g., perpendicular magnetic recording).

In conventional hard disk drives, a servo controller positions the read/write head over the desired tracks and provides compensation for disturbances and defects (e.g., runout) to hold the head in desired position. When multiple read/write heads are being used simultaneously, the servo controller provides these same functions for two or more heads. One complicating factor in simultaneous servo control of multiple heads is that different heads may be driven through large angular displacements by different sections of a split voice coil motor (VCM). The VCM rotates a stack of arms upon which each read/write head is mounted. If one part of the split VCM makes adjustments to compensate for one of the head's position, this may throw the other heads off of position.

This disclosure describes stacked, multiple-VCM actuators with features that reduce inter-actuator coupling between different rotating portions. Reduction of this coupling can reduce disturbances affecting one actuator portion while another of the actuator portions is moving. This can improve the performance of each actuator, e.g., allowing more aggressive seeking one actuator portion at the same time another actuator portion is tracking.

Figure 1:
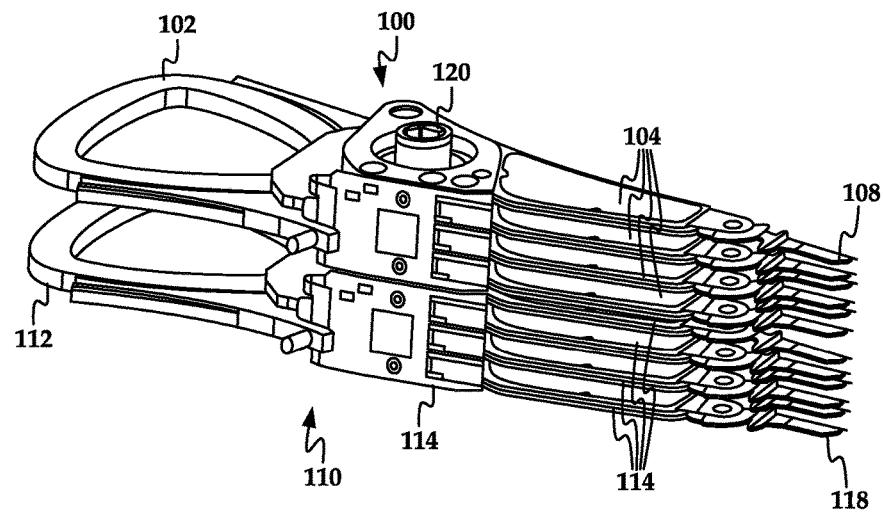
FIGS. 1 and 2 are perspective and side views of a split actuator head-stack assembly according to an example embodiment.
Figure 2:
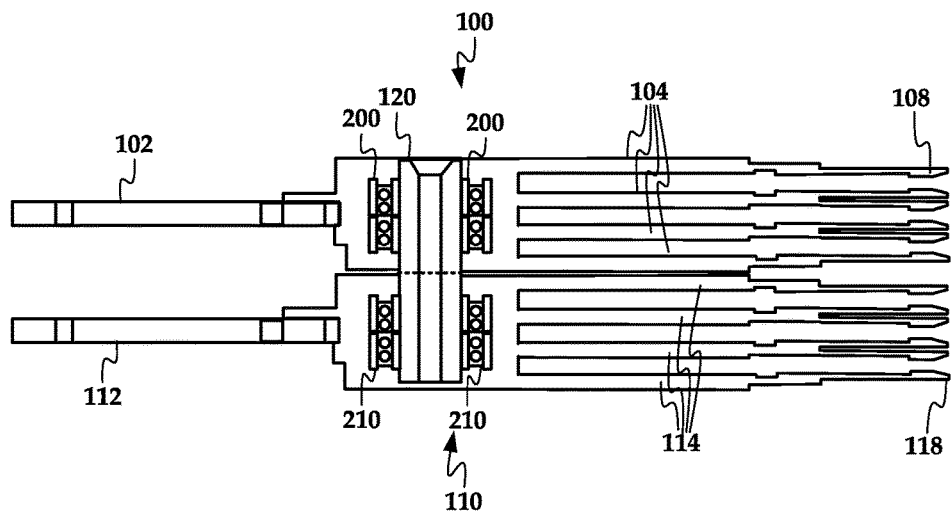

In FIGS. 1 and 2, perspective and side view show head stack assemblies 100, 110 of a stacked, multiple-VCM actuator according to an example embodiment. Each head stack assembly 100, 110 includes a coil 102, 112 and a plurality of actuator arms 104, 114. On each arm 104, 114 are located respective read/write heads (e.g., read/write heads 108, 118). The head stack assemblies 100, 110 rotate about one or more actuator shafts 120 located over a common axis. In other embodiments, two shafts may be used, e.g., stacked between the deck and cover of the drive, as indicated by the dashed line through the center of the shaft 120. As seen in FIG. 2, each head stack assembly 100, 110 is coupled to the actuator shaft(s) 120 by bearings 200, 210. While this example includes two head stack assemblies, it will be understood that this may be extended to more than two head stack assemblies and associated actuator parts, e.g., more than two actuator shafts.

Figure 3A:
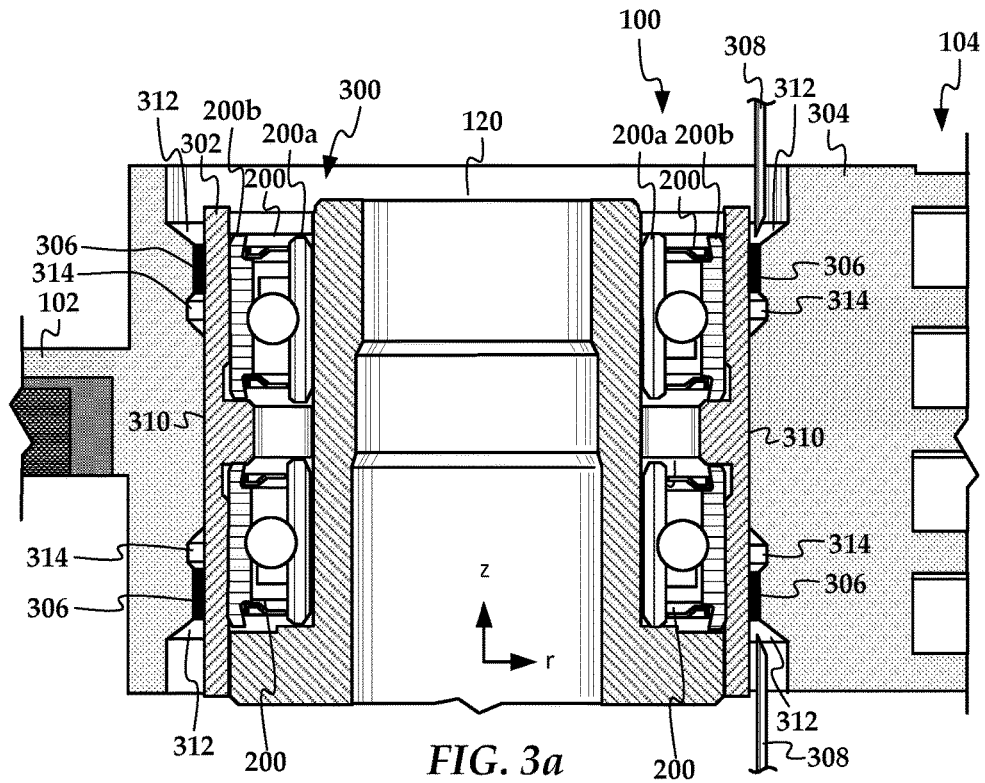
FIG. 3a is a cutaway view showing details of a head stack assembly according to an example embodiment.

In FIG. 3a, a cross sectional diagram shows additional details of a head stack assembly in a split-VCM actuator according to an example embodiment. In this view, a close up of head stack assembly 100 from FIG. 1 is shown. Same or similar features may be included in head stack assembly 110 that is used together with head stack assembly 100 in a split-actuator drive. Inner races 200a of bearings 200 interface with the actuator shaft 120. A bearing cartridge 300 includes everything between an E-block 304 and the shaft 120, including the bearings 200 and sleeve 302.

Outer races 200b of the bearings are covered by the sleeve 302. The outer surface of the sleeve 302 fits within an inner surface of the E-block 304. The arms 104 and coil 102 extend from either end of the E-block 304. The E-block 304 may be formed of aluminum and the bearing cartridge 300 may be formed from a harder and stiffer material such as stainless steel.

Annular gaps between the E-block 304 and the outer sleeve 302 are filled with bonding material 306. For example, a dispensing needle 308 may be used to inject the bonding material 306, which may be thereafter cured using ultraviolet (UV) light. In one example, the bonding material 306 comprises a 3000 series UV curable resin by ThreeBond International, Inc, such as ThreeBond™ 3037D. The bonding material 306 may also instead include anaerobic adhesives that cure without air and in contact with metal. Generally, the bonding material 306 is chosen to have a relatively low modulus of elasticity, e.g., an elastic modulus at room temperature of around 200-1000 MPa. The adhesive acts as a "spring" with stiffness that can be adjusted by both the material properties and bond geometry. It has been found that adhesives with relatively lower elastic modulus tend to exhibit relatively higher damping ratios. Put another way, adhesives can be selected with higher damping characteristics at use temperature. Lower elastic modulus focuses more strain in the adhesive to dissipate energy for key structural modes. These two things work together.

The thickness (r-dimension) of the annular gap in which the bonding material 306 is injected may be on the order of 0.0060 to 0.0080 inches. A central portion 310 of the interface between the E-block 304 and the bearing sleeve 302 may be a small clearance fit at room temperature, and is used for locating the parts for bonding. As such, the central portion 310 may slidably interface with the E-block 304 to ease assembly while still accurately locate the E-block 304 over the bearing sleeve 302.

The E-block 304 includes access gaps 312 (e.g., tapered grooves) that provide a fluid path from the annular gap via a top or a bottom of the E-block 304. Grooves 314 are also provided in the E-block 304 adjacent the bonding material 306 in the annular gap and opposite the access gaps 312. The grooves 314 are cut deeper into the E-block 304 than the gap in which the bonding material 306 is placed, therefore encompass a greater volume than the gap. The grooves 314 control the adhesive joint geometry which affects the stiffness of the adhesive joint, along with the properties of the adhesive itself. The figure shows an ideal joint, but there is variability in adhesive volume during dispensing. The gap of material 306 primarily defines the stiffness of the joint.

When applied to individual actuator portions of a split/stacked actuator, the illustrated bonding material 306 dampens vibrational modes that are either self-excited, or excited by the other actuator portion. The high-damping adhesive 306 is in a location with high strain energy for modes that are excited by both voice coil current and external vibration. Vibrational energy is dissipated in the adhesive itself, in a manner similar to a constrained layer damper. Damping could be implemented at other locations within the headstack assembly instead of or in addition to the illustrated annular gap. These other locations include between pivot cartridge shafts, and between deck and cover.

Figure 3B:
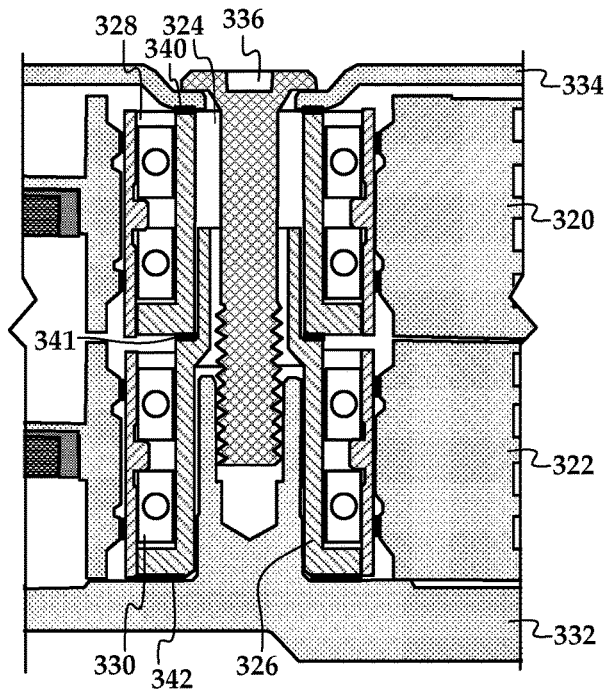
FIG. 3b is a cutaway view showing details of a head stack assembly according to an example embodiment.

In FIG. 3b, a cross sectional diagram shows additional bonding locations in a split-VCM actuator according to another example embodiment. Top and bottom E-blocks 320, 322 are shown coupled to respective top and bottom shafts 324, 326 via top and bottom bearing cartridges 328, 330. The shafts 324, 326 are secured between a deck 332 and cover 334 via a screw 336. As indicated by regions 340-342, a damping material (e.g., compression pads) can be used in addition to the bonding material in the gaps as shown in FIG. 3a.

Damping material 340 is located between the top shaft 324 and the cover 334. Damping material 341 is located between the top and bottom shafts 326, 326. Damping material 342 is located between bottom shaft 326 and deck 332. Any combination of these damping materials 340-342 may be used, e.g., only one of the damping materials 340-342 may be used, a selection of two may be used, or all three may be used. The materials 340-342 may have the same or different properties (e.g., size, modulus of elasticity, etc.). These embodiments can be assembled using existing processes with minor changes.

The head stack assembly 110 shown in FIGS. 1 and 2 may use a similar arrangement of bearing cartridge, E-block, and annular gap filled with bonding material as shown in FIG. 3a and bonding material applied at other bonding locations as shown in FIG. 3b. This ensures both head stack assemblies 100, 110 have the benefit of the reduced mechanical coupling therebetween. Note that in FIGS. 1 and 2, the head stack assemblies 100, 110 are roughly the same size, e.g., each having a set of four arms that reads from three disks. In some embodiments, a disk drive may utilize a split actuator with different sized head stack assemblies. In such a case, the bonding material may be selected to be different for each head stack assembly in order to optimize performance.

Figure 4A:
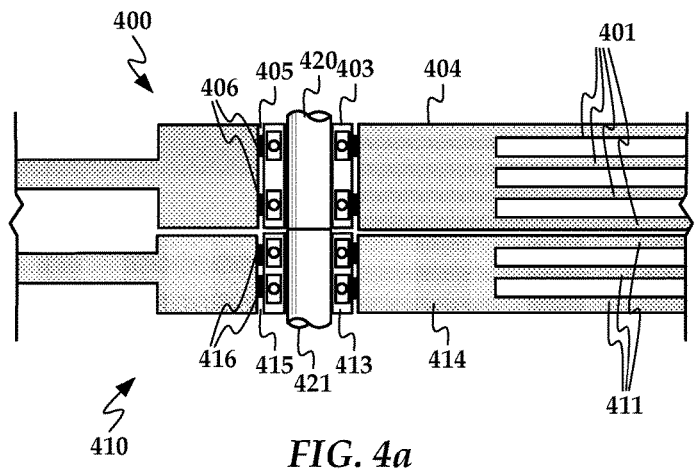
FIG. 4a is a cutaway view of a split actuator head-stack assembly according to another example embodiment.

In FIG. 4a, a cross-sectional view illustrates an example of head stack assemblies 400, 410 of different sizes according to an example embodiment. Head stack assembly 400 has four arms 401 that reads from three disks and head stack assembly 410 has three arms 411 that reads from two disks. Each of the head stack assemblies 400, 410 has respective bearings cartridges 403, 413, E-blocks 404, 414, annular gaps 405, 415, and rings of bonding material 406, 416 within respective gaps 405, 415. The bearing cartridges 403, 413 are fixably attached to stacked shafts 420, 421. The bearings cartridges 403, 413 may include respective outer sleeves (not shown) similar to sleeve 302 in FIG. 3. In such a case, the annular gaps 405, 415 and rings of bonding material 406, 416 are between the sleeves and the E-blocks 404, 414.

Because of the different sizes, the head stack assemblies 400, 410 will have different natural frequencies of vibration. As such, the bonding material rings 406, 416 may have different properties selected to suit the characteristics of the respective head stack assemblies 400, 410. These properties may include any combination of the composition of the bonding material, geometry and location of the rings 406, 416, clearance between the bearings cartridges 403, 413 and respective E-blocks 404, 414, etc. For example, as the smaller head stack assembly 410 will likely have a higher first natural frequency, the bonding material ring 416 may be stiffer than bonding material ring 406. Similarly, because the shafts 420, 421 may be different sizes, shaft bonding materials such as shown in FIG. 3b may be different for the different shafts 420, 421 and tuned for their respective natural frequencies.

Figure 4B:
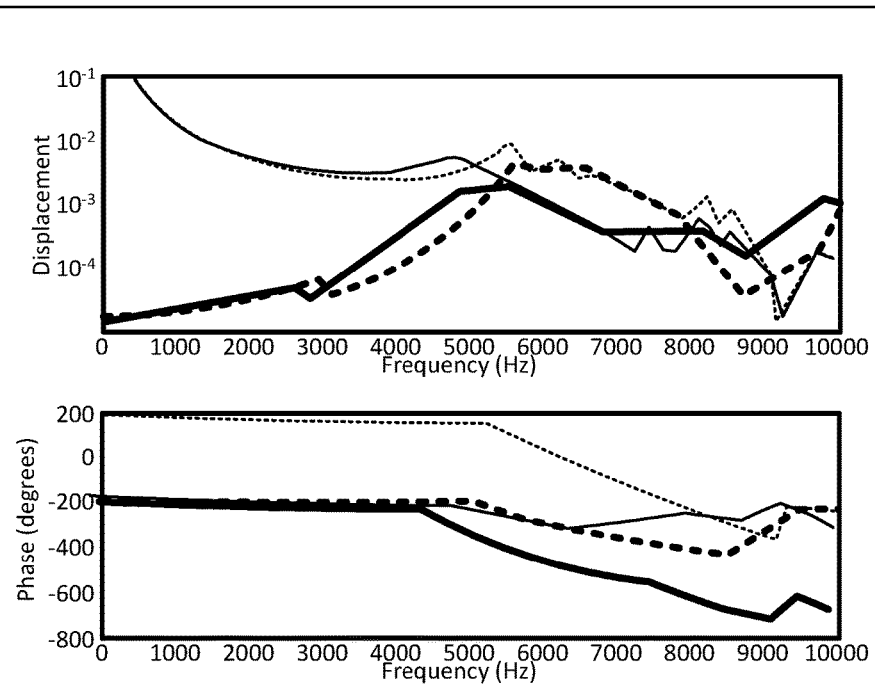
FIG. 4b is a set of plots showing the effect of bonding materials according to an example embodiment.

In FIG. 4b, Bode plots show the coil current to slider off-track transfer function according to an example embodiment. Two adhesives are compared in this example. The stiffest are represented by the dashed-line curves, the most compliant are the solid-line curves. The target response (the response of the actuator that is being moved with the current) are the top curves drawn with thinner lines. The coupled responses are the lower curves drawn with thicker lines. Note that the maximum displacement is reduced for both responses using the compliant adhesive (solid lines), even though the first natural frequency is reduced.

Figure 5:
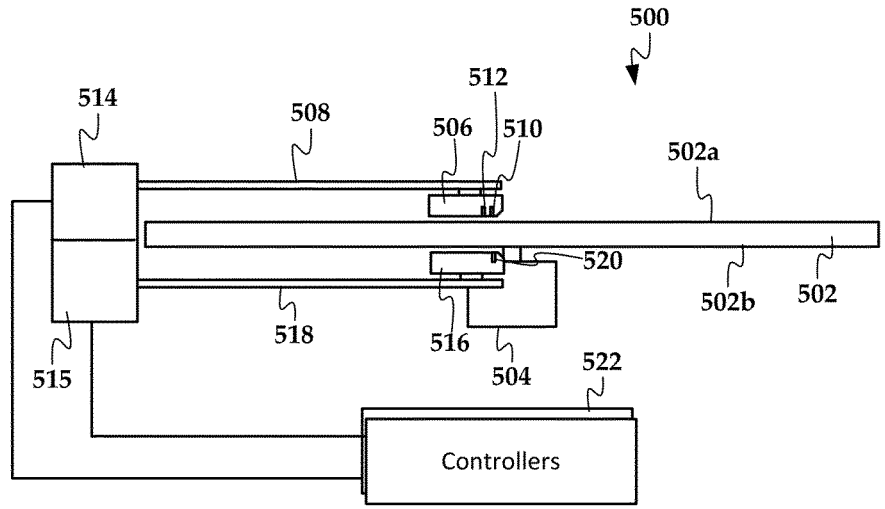
FIG. 5 is a block diagram of an apparatus according to an example embodiment.

In FIG. 5, a block diagram shows an apparatus 500 according to an example embodiment. The apparatus 500 includes at least one magnetic disk 502 driven by a spindle motor 504. A slider 506 (also referred to as a head, read/write head, read head, write head, recording head, etc.) is held over a first surface 502a of the disk 502 by an arm 508. An actuator 514 moves (e.g., rotates) the arm 508 to place the slider 506 over different tracks on the disk 502. In one embodiment, the slider includes a read transducer 510 and/or a write transducer 512. The read transducer 510 provides a signal in response to changing magnetic fields on the disk 502, and is coupled to a controller (not shown) where the separate signals are independently processed. The write transducer 512 receives signals from the controller and converts them to magnetic fields that change magnetic orientations of regions on the disk 502.

The apparatus 500 includes a second slider 516 supported by a second arm 518. The second slider 516 is held over a second surface 502b of the disk 502 and a second actuator 515 causes the second arm 518 to move to different tracks on the disk 502. The actuators 514, 515 rotate about the same axis but are split, so that the arms 508, 518 may move independently from one another. The second slider 516 also includes read and/or write transducers 520. The transducers 520 are capable of reading from and/or writing to disk surface 502b simultaneously with one or both of read/write transducers 510, 512 that access disk surface 502a.

In the examples shown in FIG. 5, more than one disk 502 may be used, and the actuators 514, 515 may be coupled to additional arms and heads that access some or all of the additional disk surfaces. In this context, "accessing" generally refers to activating a read or write transducer and coupling the transducer to a read/write channel. Independently movable heads that utilize the different split actuators 514, 515 may generally simultaneously access different surfaces, e.g., heads 506 and 516 access different surfaces 502a, 502b at the same time.

One or more controllers 532 are coupled to the respective actuators 514, 515 and control movement of the actuators 514, 524. The controllers 532 may include a system on a chip that perform such operations as servo control, encoding and decoding of data written to and read from the disk 502, queuing and formatting host commands, etc. The one or more controllers 532 provide the ability to execute multiple media read/write operations concurrently.

Figure 6:
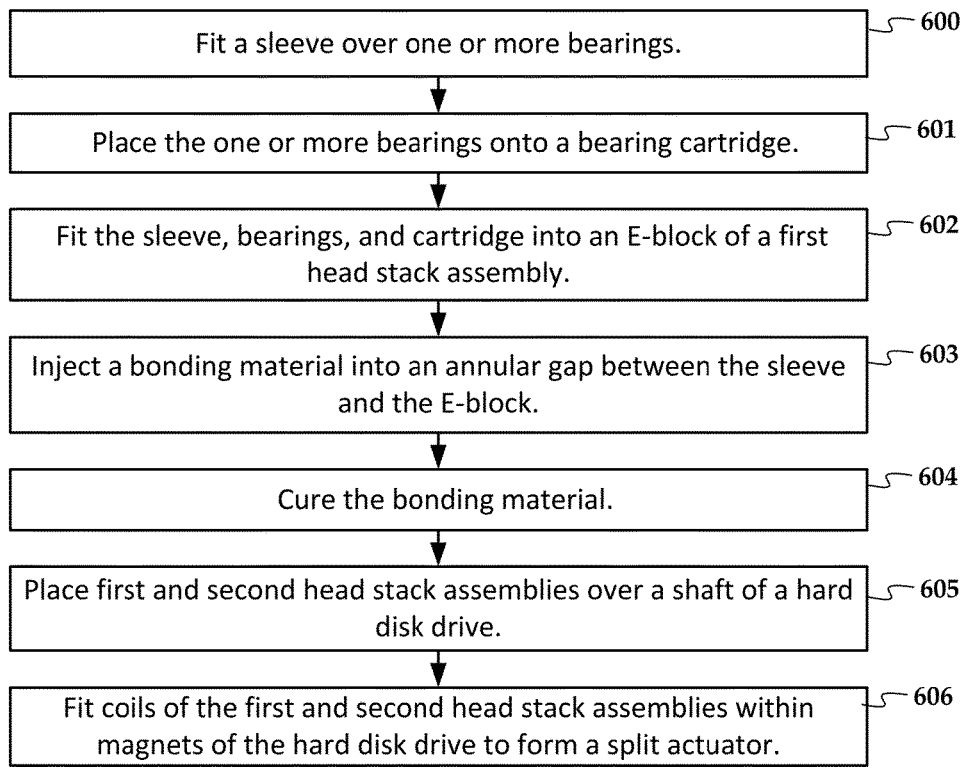
FIG. 6 is a flowchart of a method according to an example embodiment.

In FIG. 6, a flowchart shows a method according to an example embodiment. The method involves fitting 600 a sleeve over one or more bearings. The one or more bearings and sleeve are placed 601 onto a bearing cartridge. The sleeve, bearings, and cartridge are fit 602 into an E-block of a first head stack assembly. This may be a small clearance fit, for example. A bonding material is injected 603 into an annular gap between the sleeve and the E-block. The bonding material is then cured 604 to form both a bond between the bearings and the E-block, and isolate the head stack assembly from a second, similarly assembled, head stack assembly. The first and second head stack assemblies are placed 605 over a shaft of a hard disk drive. Coils of the first and second head stack assemblies are fit 606 within magnets of the hard disk drive to form a split actuator.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a non-transitory computer-readable medium and transferred to the processor for execution as is known in the art.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. An apparatus, comprising:
at least one actuator shaft;
first and second head stack assemblies coaxially located on the at least one actuator shaft, the first and second head stack assemblies each comprising:
at least one bearing having an inner race coupled to an outer surface of the at least one actuator shaft;
a bearing sleeve surrounding an outer race of the at least one bearing;
an E-block surrounding the bearing sleeve;
an annular gap between the E-block and the outer race of the at least one bearing;
a ring of bonding material filling the annular gap;
an access gap providing a fluid path to the annular gap from at least one of a top and a bottom of the E-block; and
a groove fluidly coupled to the annular gap and facing away from the access gap, the groove encompassing a greater volume than that of the annular gap.

2. The apparatus of claim 1, wherein the access gap facilitates inserting the bonding material into the annular gap.

3. The apparatus of claim 1, wherein the bonding material reduces mechanical coupling between the first and second head stack assemblies.

4. The apparatus of claim 1, wherein the bonding material has an elastic modulus at room temperature between 200 MPa and 1000 MPa.

5. The apparatus of claim 1, wherein the at least one actuator shaft comprises top and bottom stacked actuator shafts, the first and second head stack assemblies located over the respective top and bottom stacked actuator shafts.

6. The apparatus of claim 5, further comprising a damping material between the top and bottom stacked actuator shafts.

7. The apparatus of claim 5, further comprising a damping material between the top actuator shaft and a cover.

8. The apparatus of claim 5, further comprising a damping material between the bottom actuator shaft and a deck.

9. The apparatus of claim 1, wherein the groove controls an adhesive joint geometry that affects a stiffness of the ring of bonding material.

10. An apparatus comprising:
at least one actuator shaft;
first and second head stack assemblies coaxially located on the at least one actuator shaft, the first and second head stack assemblies each comprising:
two bearings stacked on an outer surface of the at least one actuator shaft;
a bearing sleeve covering outer races of the two bearings;
an E-block surrounding the bearing sleeve, a central portion of the E-block slidably in contact with the bearing sleeve and separated from the bearing sleeve by first and second annular gaps away from the central portion;
first and second rings of bonding material filling the first and second annular gaps, the first and second rings of bonding material dampening mechanical coupling between the first and second head stack assemblies; and first and second tapered access gaps providing fluid paths to the first and second annular gap from a top and a bottom of the E-block; and first and second grooves fluidly coupled to the annular gap and facing away from the respective first and second tapered access gaps, first and second grooves each encompassing a greater volume than that of the annular gap.

11. The apparatus of claim 10, wherein the access gaps facilitate inserting the bonding material into the first and second annular gaps.

12. The apparatus of claim 10, wherein the bonding material reduces mechanical coupling between the first and second head stack assemblies.

13. The apparatus of claim 10, wherein the bonding material has an elastic modulus at room temperature between 200 MPa and 1000 MPa.

14. The apparatus of claim 10, wherein the at least one actuator shaft comprises top and bottom stacked actuator shafts, the first and second head stack assemblies located over the respective top and bottom stacked actuator shafts.

15. The apparatus of claim 14, further comprising a damping material between the top and bottom stacked actuator shafts.

16. The apparatus of claim 14, further comprising a damping material between the top actuator shaft and a cover.

17. The apparatus of claim 14, further comprising a damping material between the bottom actuator shaft and a deck.

18. The apparatus of claim 10, wherein the first and second grooves control an adhesive joint geometry that affects stiffnesses of the first and second rings of bonding material.

* * * * *